(12) United States Patent
Sapozhnikov et al.

(10) Patent No.: US 10,453,480 B1
(45) Date of Patent: Oct. 22, 2019

(54) SELECTABLE READERS FOR IMPROVEMENTS IN YIELD, RELIABILITY AND PERFORMANCE

(71) Applicant: Seagate Technology LLC, Cupertino, CA (US)

(72) Inventors: Victor Sapozhnikov, Minnetonka, MN (US); Mohammed Shariat Ullah Patwari, Edina, MN (US); Jason B Gadbois, Shakopee, MN (US); Taras Grigorievich Pokhil, Arden Hills, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/980,042

(22) Filed: May 15, 2018

Related U.S. Application Data

(62) Division of application No. 15/350,797, filed on Nov. 14, 2016, now Pat. No. 9,990,941.

(51) Int. Cl.
| | |
|---|---|
| G11B 5/31 | (2006.01) |
| G11B 5/265 | (2006.01) |
| G11B 5/02 | (2006.01) |
| G11B 5/29 | (2006.01) |
| G11B 5/455 | (2006.01) |
| G11B 5/39 | (2006.01) |

(52) U.S. Cl.
CPC .......... *G11B 5/265* (2013.01); *G11B 5/02* (2013.01); *G11B 5/2651* (2013.01); *G11B 5/29* (2013.01); *G11B 5/3116* (2013.01); *G11B 5/3173* (2013.01); *G11B 5/3189* (2013.01); *G11B 5/3948* (2013.01); *G11B 5/3951* (2013.01); *G11B 5/3958* (2013.01); *G11B 5/455* (2013.01)

(58) Field of Classification Search
None
See application file for complete search history.

(56) References Cited

U.S. PATENT DOCUMENTS

| | | |
|---|---|---|
| 4,504,880 A | 3/1985 | Church et al. |
| 4,636,902 A | 1/1987 | Dalziel et al. |
| | (Continued) | |

FOREIGN PATENT DOCUMENTS

| | | | | |
|---|---|---|---|---|
| JP | 59079408 A | * | 5/1984 | ......... G11B 20/1816 |
| JP | 63103408 A | | 5/1988 | |
| | (Continued) | | | |

OTHER PUBLICATIONS

Office Action for U.S. Appl. No. 14/996,833, dated Mar. 22, 2017, 12 pages.

(Continued)

*Primary Examiner* — William J Klimowicz
(74) *Attorney, Agent, or Firm* — Westman, Champlin & Koehler, P.A.

(57) ABSTRACT

A method of forming a read head. The method includes forming first and second read sensors. A first read measurement is performed on a storage medium using the first read sensor. A second read measurement is performed on the storage medium using the second read sensor. Based on a comparison of the first and second read measurements to a predetermined quantity, either the first read sensor or the second read sensor is selected to be operational in a data storage device.

4 Claims, 9 Drawing Sheets

(56) References Cited

U.S. PATENT DOCUMENTS

| | | | |
|---|---|---|---|
| 4,962,437 A | 10/1990 | Wilcox | |
| 5,050,169 A * | 9/1991 | Monett | G11B 20/182 714/719 |
| 5,285,341 A | 2/1994 | Suzuki et al. | |
| 5,602,704 A | 2/1997 | Gooch et al. | |
| 5,742,995 A | 4/1998 | Armin et al. | |
| 5,799,388 A * | 9/1998 | Shouji | G11B 5/10 216/22 |
| 5,896,249 A * | 4/1999 | Fontana, Jr. | G11B 5/3103 360/234.5 |
| 6,104,562 A | 8/2000 | Ottesen et al. | |
| 6,249,890 B1 | 6/2001 | Ukani et al. | |
| 6,320,714 B1 | 11/2001 | Moon et al. | |
| 6,373,649 B1 | 4/2002 | Walker et al. | |
| 6,424,475 B1 | 7/2002 | Bhandari et al. | |
| 6,459,260 B1 | 10/2002 | Bonin et al. | |
| 6,729,013 B2 * | 5/2004 | Sasaki | G11B 5/313 29/603.07 |
| 6,735,062 B1 | 5/2004 | Pokhil et al. | |
| 6,884,148 B1 | 4/2005 | Dovek et al. | |
| 6,956,722 B2 | 10/2005 | Wada et al. | |
| 6,987,637 B2 | 1/2006 | Litvinov et al. | |
| 7,075,761 B2 | 7/2006 | Parker | |
| 7,102,842 B1 | 9/2006 | Howard et al. | |
| 7,236,392 B2 * | 6/2007 | Saruki | G11C 11/16 360/324.2 |
| 7,508,619 B2 | 3/2009 | Okamoto et al. | |
| 7,532,437 B2 | 5/2009 | Liu et al. | |
| 8,289,644 B2 | 10/2012 | Holmberg | |
| 8,289,662 B2 | 10/2012 | Iben | |
| 8,310,782 B2 | 11/2012 | Song et al. | |
| 8,339,752 B1 | 12/2012 | Hattori et al. | |
| 8,502,332 B2 | 8/2013 | Sasaki et al. | |
| 8,552,716 B2 | 10/2013 | Ueda et al. | |
| 8,693,126 B2 | 4/2014 | Buckholdt et al. | |
| 8,724,265 B2 | 5/2014 | Qiu et al. | |
| 9,064,504 B1 * | 6/2015 | Sannino | G11B 21/08 |
| 9,099,103 B1 | 8/2015 | Krichevsky | |
| 9,099,125 B1 | 8/2015 | Hattori et al. | |
| 9,142,246 B1 | 9/2015 | Trantham et al. | |
| 9,251,844 B1 | 2/2016 | Wheelock et al. | |
| 9,251,856 B1 | 2/2016 | Wheelock et al. | |
| 9,286,926 B1 | 3/2016 | Dhanda et al. | |
| 9,299,369 B1 | 3/2016 | Biskeborn et al. | |
| 9,361,916 B1 | 6/2016 | Chung et al. | |
| 9,387,568 B1 | 7/2016 | Ilaw et al. | |
| 9,396,745 B2 | 7/2016 | Macken et al. | |
| 9,401,161 B1 | 7/2016 | Jury et al. | |
| 9,401,167 B2 | 7/2016 | Pokharel et al. | |
| 9,431,031 B1 | 8/2016 | Xiao et al. | |
| 9,449,622 B2 | 9/2016 | Biskeborn et al. | |
| 9,536,550 B1 | 1/2017 | Ma et al. | |
| 9,558,774 B1 | 1/2017 | Macken | |
| 9,576,597 B2 | 2/2017 | Trantham et al. | |
| 9,613,642 B1 | 4/2017 | Erden et al. | |
| 9,773,517 B2 | 9/2017 | Gao et al. | |
| 9,805,744 B1 | 10/2017 | Xue et al. | |
| 9,818,445 B2 | 11/2017 | Zhu et al. | |
| 9,858,961 B2 | 1/2018 | Zhu et al. | |
| 9,865,301 B1 | 1/2018 | Wiesen et al. | |
| 9,947,357 B2 * | 4/2018 | Rausch | G11B 5/607 |
| 9,990,941 B1 * | 6/2018 | Sapozhnikov | G11B 5/265 |
| 10,049,690 B1 * | 8/2018 | Sapozhnikov | G11B 5/3189 |
| 2002/0075595 A1 | 6/2002 | Sato et al. | |
| 2002/0112343 A1 | 8/2002 | Goubau et al. | |
| 2004/0042118 A1 | 3/2004 | Notsuke et al. | |
| 2004/0130321 A1 | 7/2004 | Kasajima et al. | |
| 2006/0002021 A1 | 1/2006 | Li et al. | |
| 2006/0044677 A1 | 3/2006 | Li et al. | |
| 2007/0236819 A1 | 10/2007 | Hashizume | |
| 2008/0024900 A1 | 1/2008 | Okamoto et al. | |
| 2008/0036455 A1 | 2/2008 | Beach et al. | |
| 2008/0204913 A1 | 8/2008 | Umezaki et al. | |
| 2008/0231985 A1 | 9/2008 | Okamoto | |
| 2009/0161243 A1 | 6/2009 | Sharma et al. | |
| 2009/0208777 A1 | 8/2009 | Ito et al. | |
| 2009/0251821 A1 | 10/2009 | Song et al. | |
| 2010/0007986 A1 | 1/2010 | Mak et al. | |
| 2010/0146773 A1 | 6/2010 | Li et al. | |
| 2010/0302662 A1 * | 12/2010 | Toba | G11B 5/3116 360/31 |
| 2011/0007426 A1 | 1/2011 | Qiu et al. | |
| 2011/0050211 A1 | 3/2011 | Gao et al. | |
| 2011/0051294 A1 | 3/2011 | Gao et al. | |
| 2011/0134572 A1 | 6/2011 | Qiu et al. | |
| 2012/0206830 A1 | 8/2012 | Gao et al. | |
| 2013/0286502 A1 | 10/2013 | Erden et al. | |
| 2013/0286511 A1 * | 10/2013 | Edelman | G11B 5/29 360/234.3 |
| 2013/0314816 A1 | 11/2013 | Gao et al. | |
| 2014/0063644 A1 | 3/2014 | Lou et al. | |
| 2014/0153134 A1 | 6/2014 | Han et al. | |
| 2015/0009787 A1 | 1/2015 | Rausch et al. | |
| 2015/0117173 A1 | 4/2015 | Green et al. | |
| 2015/0248904 A1 | 9/2015 | Aoyama et al. | |
| 2016/0125900 A1 | 5/2016 | Biskeborn et al. | |
| 2018/0268920 A1 | 9/2018 | Kobayashi et al. | |
| 2019/0051320 A1 * | 2/2019 | Sapozhnikov | G11B 5/3189 |
| 2019/0147908 A1 * | 5/2019 | Klarqvist | G11B 5/4853 |

FOREIGN PATENT DOCUMENTS

| | | | | |
|---|---|---|---|---|
| JP | 2003091805 A | * | 3/2003 | G11B 5/486 |
| JP | 2005056515 A | * | 3/2005 | |
| JP | 2005-339781 A | | 12/2005 | |
| JP | 2008-084430 A | | 4/2008 | |
| JP | 2011123935 A | * | 6/2011 | G11B 5/455 |

OTHER PUBLICATIONS

Office Action for U.S. Appl. No. 15/350,797, dated Sep. 18, 2017, 10 pages.
Office Action for U.S. Appl. No. 15/813,374, dated Mar. 8, 2018, 10 pages.
Wang, Shan X. et al., "Magnetic Information Storage Technology", Chapter 5—Inductive Magnetic Heads, 5.2 Fabrication of Thin-Film Inductive Films, Copyright © 1999 by Academic Press, 7 pages.
Wang, Yangfan, "Design and Optimization of Collocated Dual Stage Actuated Suspensions in Hard Disk Drives Using Finite Element Analysis", UC San Diego, UC San Diego Electronic Theses and Dissertations, Publication Date: Jan. 1, 2015, 66 pages.
Non-Final Rejection for U.S. Appl. No. 16/055,699, dated Feb. 4, 2019, 12 pages.
USPTO-issued prosecution history for U.S. Appl. No. 15/671,482, filed Aug. 8, 2017, including: Notice of Allowance dated Apr. 17, 2018, 12 pages; and Requirement for Restriction/Election dated Feb. 1, 2018, 13 pages; 25 pages total.
Non-Final Rejection from U.S. Appl. No. 16/055,699, dated Feb. 4, 2019, 12 pages.
Notice of Allowance and Fees Due (PTOL-85) for U.S. Appl. No. 15/350,797, dated Feb. 9, 2018, 9 pages.
Requirement for Restriction/Election for U.S. Appl. No. 16/055,699, dated Oct. 5, 2018, 10 pages.
Requirement for Restriction/Election for U.S. Appl. No. 15/350,797, dated Jun. 14, 2017, 13 pages.
Prosecution history of U.S. Appl. No. 14/996,833, filed Jan. 15, 2016, including: Notice of Allowance dated Nov. 9, 2017, 5 pages; Notice of Allowance dated Jul. 12, 2017, 8 pages; Non-Final Rejection dated Mar. 22, 2017, 12 pages; Requirement for Restriction/Election dated Oct. 19, 2016, 7 pages; 32 pages total.
Non-Final Rejection for U.S. Appl. No. 16/360,770, dated May 14, 2019, 7 pages.

* cited by examiner

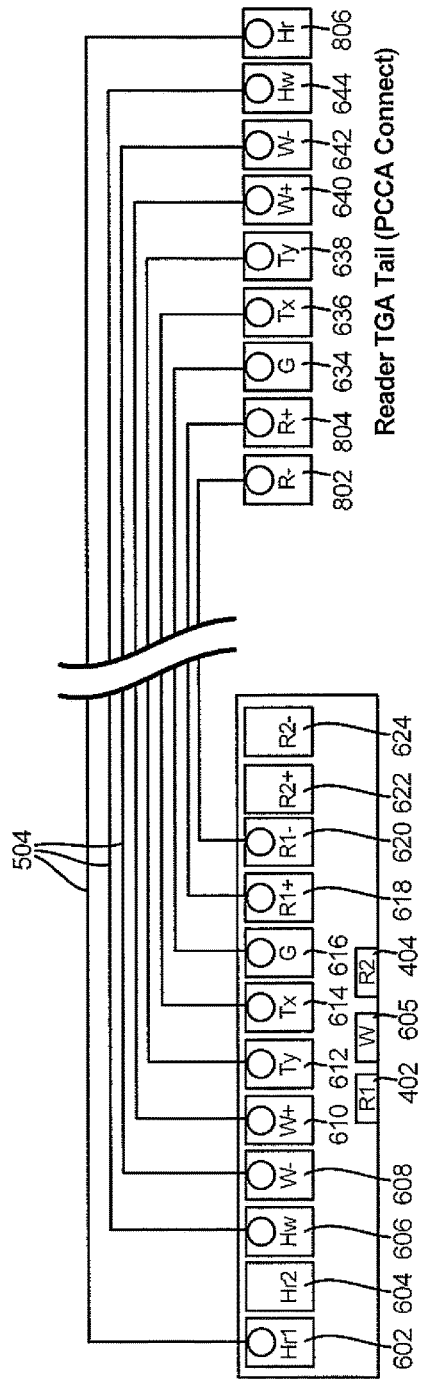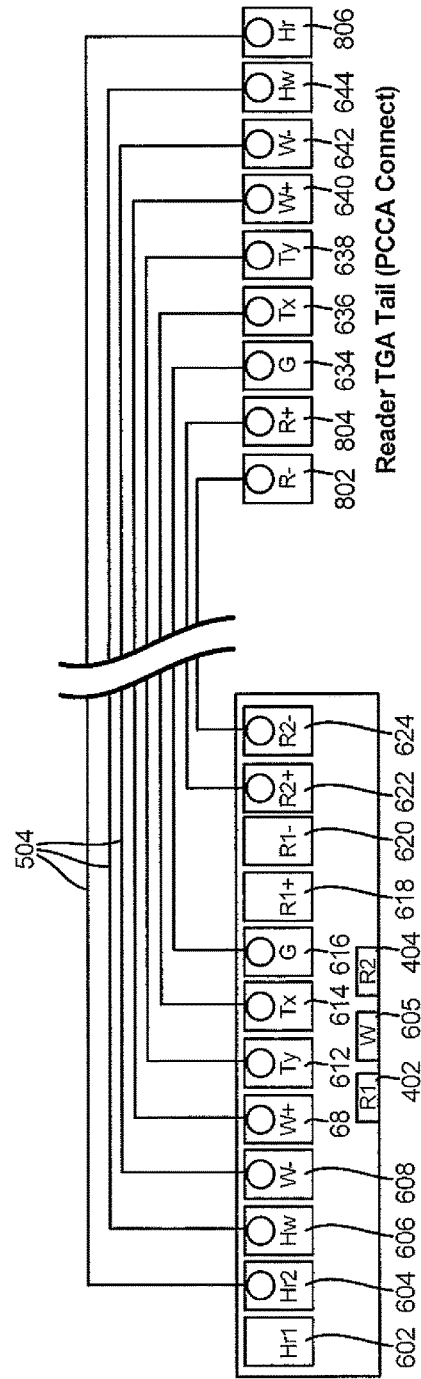

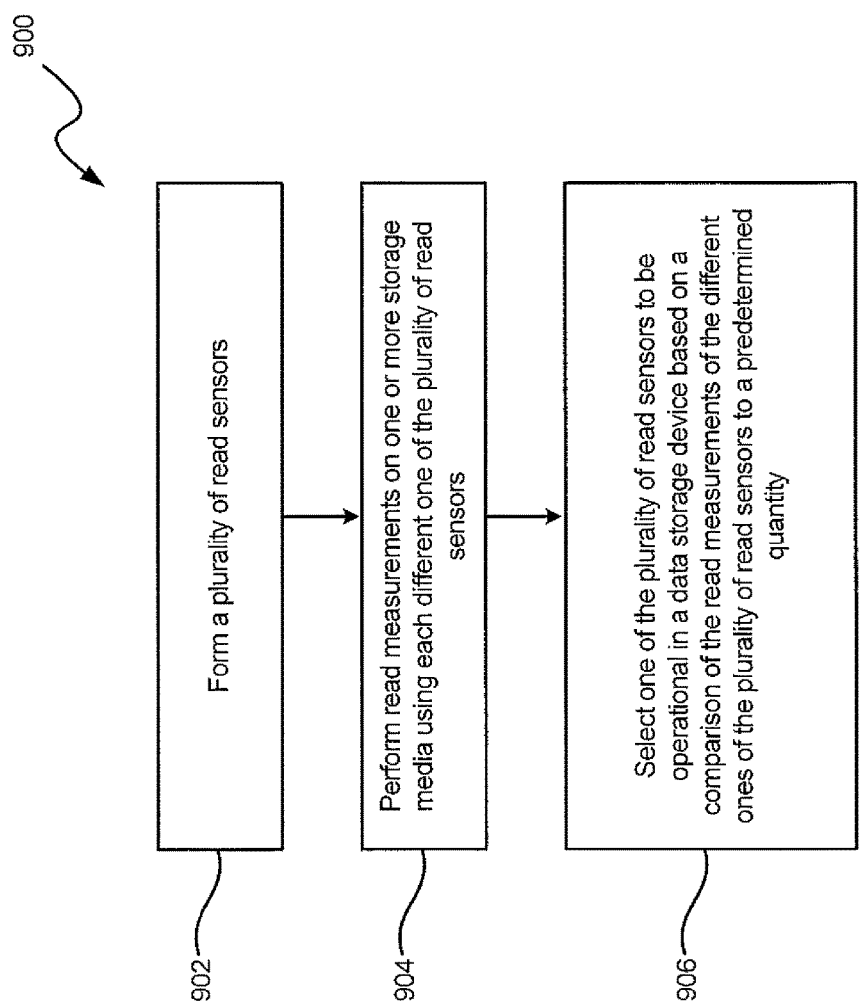

SELECTABLE READERS FOR IMPROVEMENTS IN YIELD, RELIABILITY AND PERFORMANCE

CROSS-REFERENCE TO RELATED APPLICATION

This application is a divisional application of U.S. application Ser. No. 15/350,797, filed on Nov. 14, 2016, the content of which is hereby incorporated by reference.

BACKGROUND

Data storage devices, such as disc drives, use magnetic recording heads to read and/or write data on magnetic storage media, such as a data storage discs. In a typical disc drive, one or more discs are mounted on a spindle motor, which causes the disc(s) to spin. Recording heads carried by a slider are used to read from and write to data tracks on the disc(s). The slider is typically carried by a head arm assembly that includes an actuator arm and a suspension assembly. During operation, as the disc spins, the slider glides above the surface of the disc on a small cushion of air, for example, and the actuator arm pivots to movably position the slider with respect to the disc.

As areal recording densities for storage discs increase, technological advances and changes to various components of the disc drives are needed.

SUMMARY

The present disclosure relates to fabricating a read head or read transducer with multiple read sensors, and then selecting one of the read sensors that is most suitable for operation in a data storage device such as a disc drive.

In one embodiment, a method of forming a read head is provided. The method includes forming first and second read sensors. A first read measurement is performed on a storage medium using the first read sensor. A second read measurement is performed on the storage medium using the second read sensor. Based on a comparison of the first and second read measurements to a predetermined quantity, either the first read sensor or the second read sensor is selected to be operational in a data storage device.

This summary is not intended to describe each disclosed embodiment or every implementation of the selectable readers. Many other novel advantages, features, and relationships will become apparent as this description proceeds. The figures and the description that follow more particularly exemplify illustrative embodiments.

BRIEF DESCRIPTION OF THE DRAWINGS

FIGS. 8A and 8B are schematic diagrams showing electrical connections between sliders and TGAs.

FIG. 9 is a simplified flow diagram of a general method embodiment.

DETAILED DESCRIPTION OF ILLUSTRATIVE EMBODIMENTS

Embodiments described below relate to fabrication of a read head or read transducer with multiple read sensors, and then selecting one of the read sensors that is most suitable for operation in a data storage device such as a disc drive. However, prior to providing additional details regarding the different embodiments, a description of an illustrative operating environment is provided below.

Figure 1:
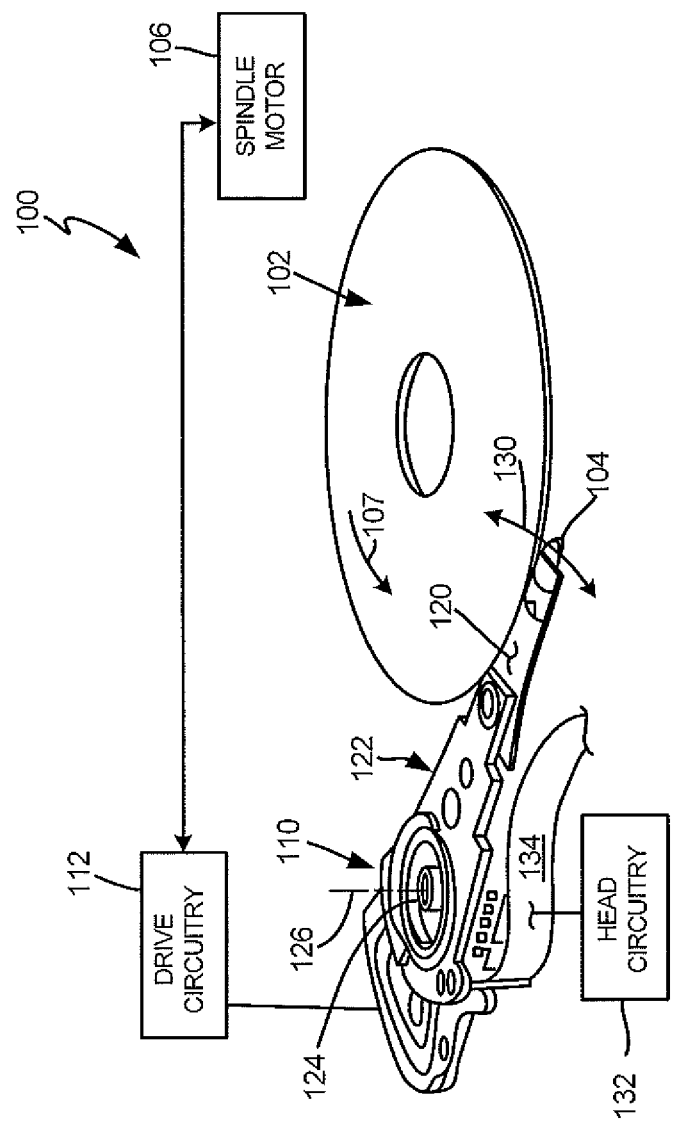
FIG. 1 illustrates an embodiment of a data storage device in which embodiments of the present application can be used.

FIG. 1 shows an illustrative operating environment in which certain reader embodiments formed as disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments. It should be noted that the same reference numerals are used in different figures for same or similar elements.

FIG. 1 is a schematic illustration of a data storage device 100 including a data storage medium and a head for reading data from and writing data to the data storage medium. As shown in FIG. 1, the data storage device 100 includes a data storage medium or disc 102, which may be a magnetic storage disc, and a head 104. The head 104 including transducer elements (not shown in FIG. 1) is positioned above the data storage medium 102 to read data from and write data to the data storage medium 102. For read and write operations, a spindle motor 106 (illustrated schematically) rotates the medium 102 as illustrated by arrow 107 and an actuator mechanism 110 positions the head 104 relative to data tracks on the rotating medium 102. Both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection.

The transducer elements of the head 104 are coupled to head circuitry 132 through flex circuit 134, also known as printed circuit cable assembly (PCCA), to encode and/or decode data. Although FIG. 1 illustrates a single load beam 120 coupled to the actuator mechanism 110, additional load beams 120 and heads 104 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 104 in a cross track direction as illustrated by arrow 130.

Figure 2:
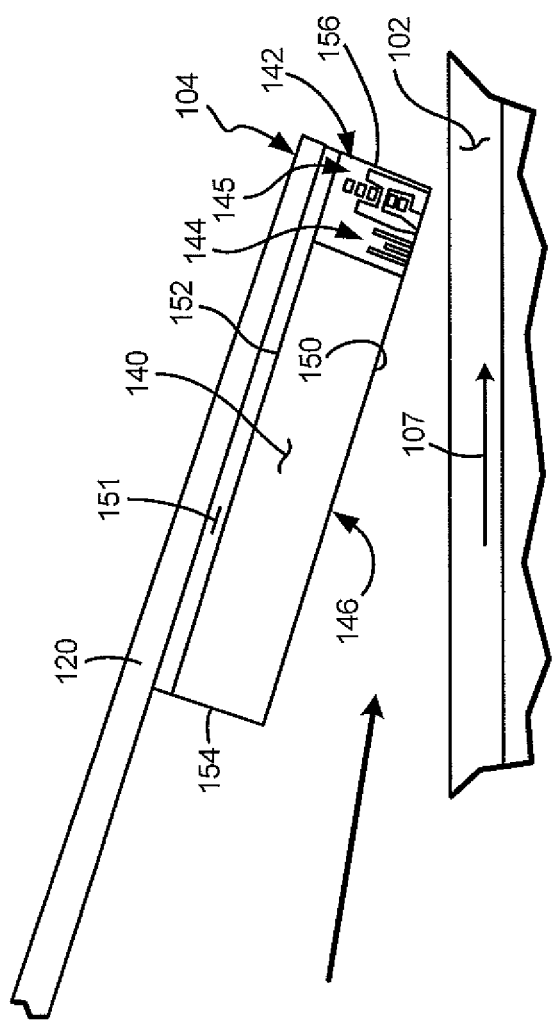
FIG. 2 is a schematic illustration of a head including one or more transducer elements above a magnetic recording medium.

FIG. 2 is a detailed illustration (side view) of the head 104 above the medium 102. The transducer elements on the head 104 are fabricated on a slider 140 to form a transducer portion 142 of the head 104. The transducer portion 142 shown in FIG. 2 includes a read element 144 and a write element 145. Alternatively, the head 104 may be a head exclusively for reading that includes only the read element 144 and no write element 145.

As shown, the head 104 includes a bearing surface (for example, an air bearing surface (ABS)) 146 along a bottom surface 150 of the head or slider facing the medium 102. The head 104 is coupled to the load beam 120 through a gimbal spring 151 coupled to a top surface 152 of the head or slider 140 facing away from the medium 102. The medium 102 can be a continuous storage medium, a discrete track medium, a bit patterned medium or other magnetic storage medium including one or more magnetic recording layers.

During operation, rotation of the medium or disc 102 creates an air flow in direction 107 as shown in FIG. 2 along the ABS 146 of the slider 140 from a leading edge 154 to the trailing edge 156 of the slider 140 or head 104. Air flow along the air bearing surface 146 creates a pressure profile to support the head 104 and slider 140 above the medium 102 for read and write operations. As shown, the transducer portion 142 is formed at or near the trailing edge 156 of the slider 140. A description of a general embodiment for forming of a transducer portion such as 142 on a wafer is provided below in connection with FIG. 3. Thereafter, details regarding specific embodiments are provided.

Figure 3:
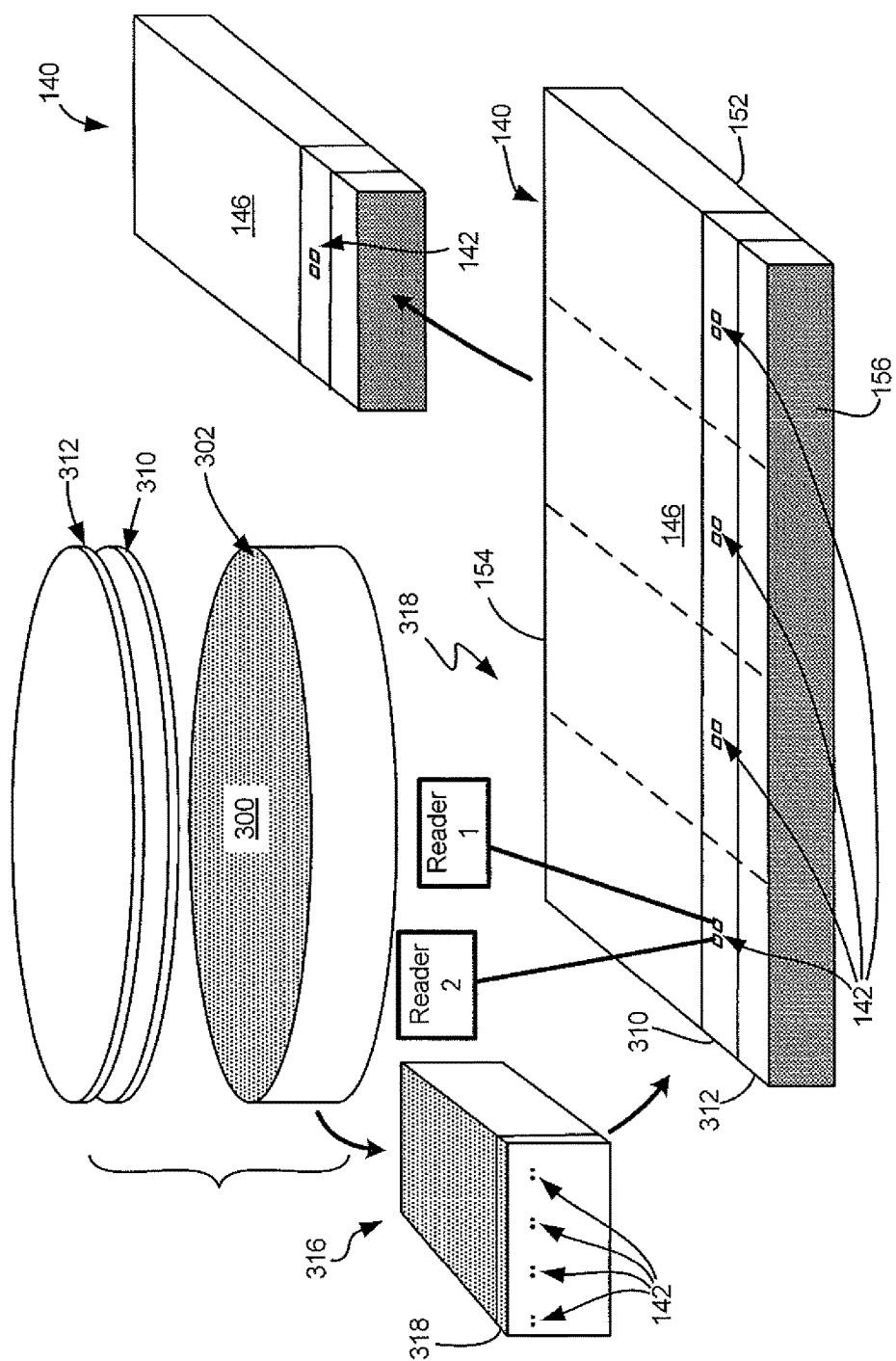
FIG. 3 is a schematic illustration of a wafer fabrication sequence for heads of a data storage device.

FIG. 3 is a schematic illustration of a wafer fabrication sequence for heads of a data storage device. As shown in FIG. 3, multiple thin film deposition layers are deposited on a surface 300 of a wafer or substrate 302 to form transducer elements 142 (illustrated schematically in FIG. 3). As shown, the multiple deposition layers include one or more read element layers 310 and write element layers 312. The read and write element layers 310, 312 are illustrated schematically in FIG. 3. Following deposition of the read and write element layers 310, 312, the wafer 302 is sliced into a bar chunk 316. The bar chunk 316 includes a plurality of slider bars 318 (one slider bar 318 is shown exploded from the chunk 316).

The sliced bars 318 have a leading edge 154, a trailing edge 156, a bearing surface (for example, an air bearing surface (ABS)) 146 and a back/top surface 152. After the bars 318 are sliced from chunks 316, the transducer elements 142 (read and write elements) deposited on the wafer 302 are orientated along the air bearing surface(s) 146 at the trailing edge 156 of the slider bar 318. The slider bar 318 is sliced to form the sliders 140. Typically, the bar 318 is lapped and the bearing surface(s) 146 are etched prior to slicing the bar 318 to form the individual sliders 140. Illustratively, the wafer 302 is formed of a ceramic material such as alumina (Al$_2$O$_3$)—titanium carbide (Ti—C). The read and write elements are fabricated on the ceramic or substrate material of the wafer 302 to form a slider body 140 of the head, and the one or more deposition layers 310, 312 form the transducer elements 142 proximate to the trailing edge 156 of the slider body 140.

In one embodiment, fabrication of read element layer(s) 310 is carried out such that each read transducer has at least two read sensors (e.g., Reader 1 and Reader 2 in FIG. 3). Different embodiments of single read transducers that each have two read sensors are shown in FIGS. 4A-4D and are described below.

Figure 4A:
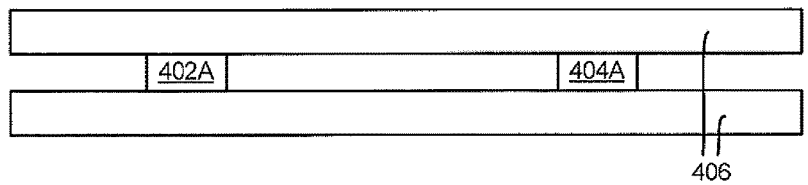
FIGS. 4A-4D are air bearing surface views of embodiments of read heads.

FIG. 4A illustrates an embodiment of a read transducer portion 400A of a recording head viewed from an ABS. A writer portion, which may be included in some recording head embodiments, is not shown in FIG. 4A in the interest of simplification. In the embodiment of FIG. 4A, read transducer 400A includes two substantially coplanar read sensors denoted by reference numerals 402A and 404A, respectively. Read sensors 402A and 404A are positioned between a pair of reader shields 406. A suitable insulating material may be utilized to separate sensors 402A and 404A. The fabrication process of the coplanar read sensors 402A and 404A is substantially similar to the fabrication of a read transducer with a single read sensor. This is because, as shown in FIG. 3, the same read element layer(s) 310 (of FIG. 3), which are deposited on substrate or wafer 302 (of FIG. 3), are employed for read transducers that include single sensors or multiple coplanar sensors.

Figure 4B:
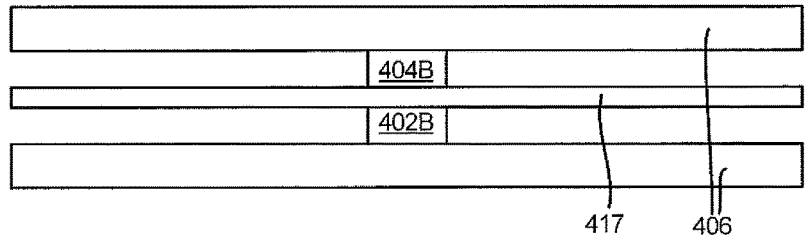

In some embodiments, the multiple read sensors are located one above the other in the read transducer. Such a read transducer 400B is shown in FIG. 4B. To form read transducer 400B, the read element layers 310 (of FIG. 3) may be deposited twice. A middle shield 417 may be included between read sensors 402B and 404B of read transducer 400B. It should be noted that, although FIG. 4B shows read sensors 402B and 404B aligned with each in a vertical direction, sensors 402B and 404B may be offset from each other in various embodiments.

As indicated above, one of read sensors 402A or 404A of read transducer 400A (or one of read sensors 402B or 404B of read transducer 400B) is selected for operation in a data storage device. The selection of the reader sensor may be made at different stages of manufacturing (e.g., wafer, slider, head gimbal assembly or trace gimbal assembly, or in the data storage device (e.g. a disc drive)). Making the selection at the drive level before shipping the drive would capture the highest percentage of the reader failures and thus improve the yield. To address a condition of relatively low yield, in some embodiments, it may be beneficial to fabricate read transducers with more than two read sensors and choose one of the read sensors to be operational in the drive. In general, depending on the application/embodiment, fabricating a read transducer with two or more read sensors, and then choosing one of the read sensors to be operational in the drive improves yield. In the drive, an electronic switch may be used to make a selection of the read sensor.

Additionally, the design can improve reader reliability. Specifically, in embodiments in which the read sensor choice is made in the drive, if one of the read sensors fails in the field and the other read sensor is operable, the read sensor selection can be reversed so that the drive will not fail.

An additional benefit of the design is that when both read sensors are operable, the read sensor with the better bit error rate (BER)/areal density capability (ADC) and stability characteristics (e.g., bits in error (BIE)) can be chosen. For instance, experiments show that a 2-3% reader related ADC sigma or standard deviation in heads can be taken advantage of by choosing the better read sensor. This benefit can be increased by building the two readers with different geometries (e.g., different stripe heights and/or different read widths, etc.). By this approach, the stripe height and/or read width sigma may be reduced by choosing the read sensor with the "better" stripe height and/or read width.

For example, a first read sensor of a read transducer may have a first target width and the second read sensor of the read transducer may have a second target width. The first target width may be selected to be wider than a median target width and the second target width may be selected to be narrower than the median target width. In such embodiments, if the fabrication process drifts wider, the read sensor formed with the selected narrower target width will have an actual width that is closer to the median target width. Similarly, if the fabrication process drifts narrower, the reader formed with the selected wider target width will have actual widths that are closer to the median target width.

Figure 4C:
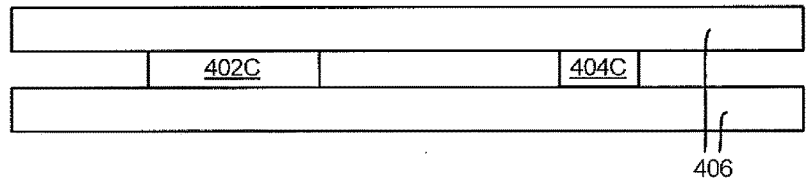
Figure 4D:
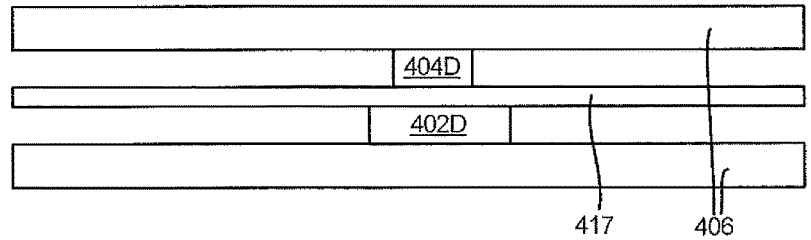

Examples of read transducers having read sensors with different widths are shown in FIGS. 4C and 4D. In FIG. 4C, the read transducer is denoted by reference numeral 400C and the substantially coplanar first and second read sensors are denoted by reference numerals 402C and 404C, respectively. In FIG. 4D, the read transducer is denoted by reference numeral 400D and the stacked first and second read sensors are denoted by reference numerals 402D and 404D, respectively. In both read transduces 400C and 400D, first read sensor 402C, 402D is wider than second read sensor 404C, 404D.

In the embodiments of FIGS. 4C and 4D, selection of the read sensor may be made based on closer proximity to the median target width. Similarly, read sensors may be fabricated with different target stripe heights and the selection of the read sensor may be made based on closer proximity to the median target stripe height. In general, the read sensor with the relatively higher performance and stability may be chosen.

Figure 5:
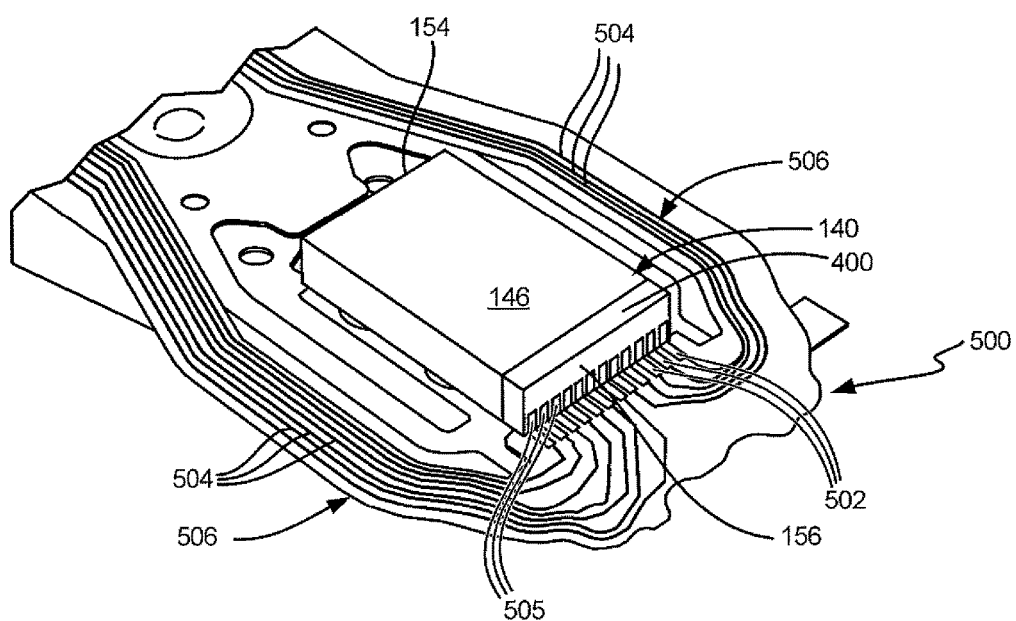
FIG. 5 is a diagrammatic illustration showing an interconnect portion providing an electrical interface to electrical elements of a recording head.

As noted above, testing and selecting one of the read sensors (for example, Reader 1 or Reader 2 of FIG. 3, first read sensor 402A or second read sensor 404A of FIG. 4A, etc.) to be operational in a data storage device are integral to taking advantage of the above-described embodiments. This may involve electrically testing, for example, the first read sensor 402A and the second read sensor 400B of a read transducer such as 400A. FIG. 5 is an embodiment showing an interconnect portion 500, also known as trace gimbal assembly (TGA), providing an electrical interface to electrical elements of a recording head 400, which includes first and second read sensors of the type shown in FIGS. 3 through 4D. In the interest of simplification, the first and second read sensors are not shown in FIG. 5. In FIG. 5, a slider 140 having a leading edge 154 and a trailing edge 156 is shown with its ABS 146 facing upwards. As can be seen in FIG. 5, the interconnect portion or TGA 500 includes a plurality of bond pads 502 coupled to the traces 504 along spaced gimbal arms 506 of a flex circuit extending along opposed sides of the slider 140 to electrically connect the transducer elements of the recording head 400 to the head circuitry 132 (shown in FIG. 1). In one embodiment, the traces 504 and bond pads 502 are formed of copper or other conductive material. Bond pads 502 connect to head/slider connection pads 505. A schematic diagram of slider-trace connections in accordance with one embodiment is shown in FIG. 6 and described below.

Figure 6:
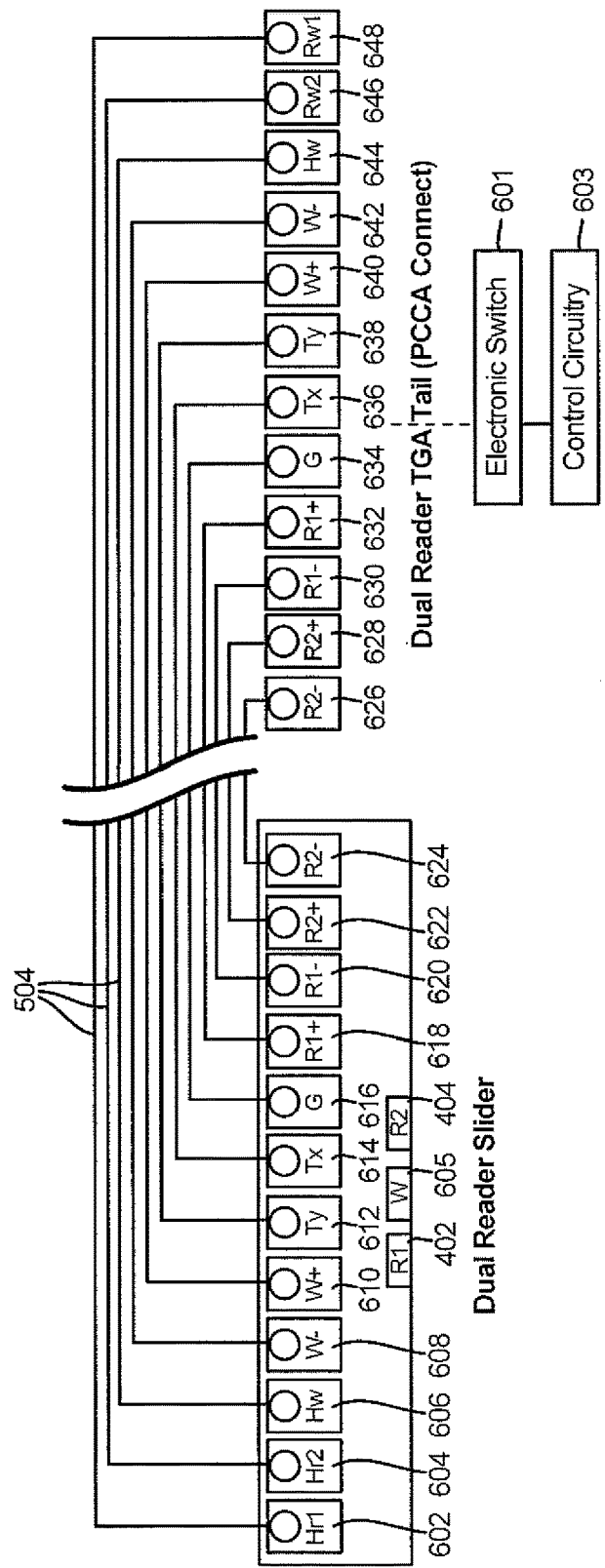
FIG. 6 is a schematic diagram showing electrical connections between a slider and a trace gimbal assembly (TGA).

FIG. 6 is a schematic diagram showing electrical connections between a slider including a recording head such as 400 having dual read sensors (for example, R1 402 and R2 404) and a TGA. In the embodiment of FIG. 6, both read sensors and reader heaters may be connected to PCCA 134 (shown in FIG. 1) of a disc drive, for example, thereby allowing for selected operation of the read sensors in the drive. The selection of one of the dual read sensors may be carried out with the help of an electronic switch 601 and control circuitry 603 that may be within the head circuitry 132 (shown in FIG. 1). In FIG. 6, the writer is denoted by reference numeral 605. In the interest of simplification, internal slider connections are not shown. As can be seen in FIG. 6, the dual read sensor slider includes a plurality electrical connection pads. The pads include a heater for R1 (Hr1) pad 602, a heater for R2 (Hr2) pad 604, a heater for the writer (Hw) pad 606, writer connection pads (W−) 608 and (W+) 610, thermal asperity detection sensor pads (Ty) 612 and (Tx) 614, a ground connection (G) pad 616, R1 402 connection pads (R1+) 618 and (R1−) 620, and R2 404 connection pads (R2+) 622 and (R2−) 624. Equivalent TGA connection pads 626-648 are included on the right side of FIG. 6. The interconnect traces are represented by reference numeral 504.

A can be seen in FIG. 6, both read sensors R1 402 and R2 404 (and the read sensor heaters) are electrically connected via the TGA, such that testing and selection of the optimal read sensor (R1 402 or R2 404) can occur at a component spinstand tester and/or in the respective disc drive that employs the recording head. As noted above, selection of one of the dual read sensors may be carried out with the help of an electronic switch 601 and control circuitry 603. As noted earlier, making the selection at the drive level would capture the highest percentage of the reader failures.

An alternate embodiment is to test and select the optimal read sensor using a slider dynamic electrical test (SDET). A head suspension assembly employed to carry out a SDET may include a socket or other feature that releasably secures a slider for the test to be conducted. Such a method of testing a dual read sensor recording head is described below in connection with FIG. 7.

Figure 7:
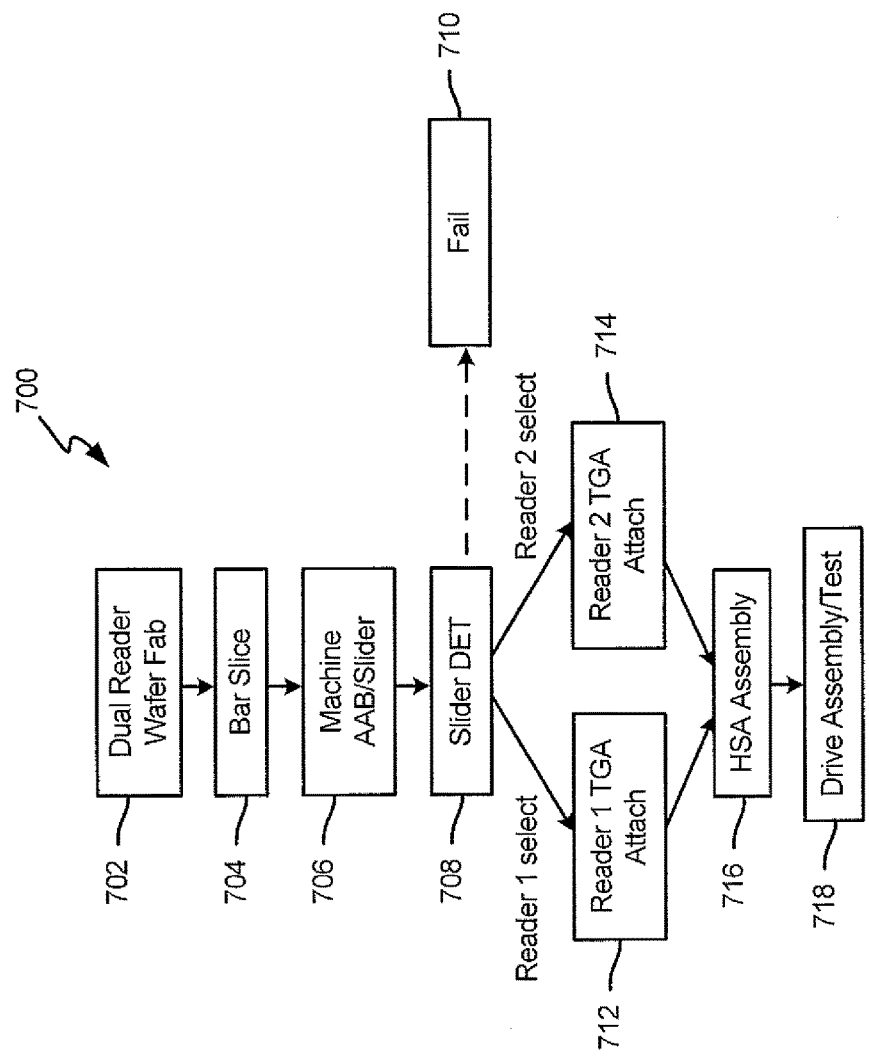
FIG. 7 is a simplified flow diagram of a method of testing a dual reader slider in accordance with one embodiment.

FIG. 7 is a simplified flow diagram 700 of a method of testing a dual read sensor slider in accordance with one embodiment. At step 702, fabrication of a dual read sensor wafer is carried out as described above in connection with FIG. 3. Thereafter, the fabricated wafer is sliced into bars at step 704 and machined to form sliders with air bearing surfaces at step 706. Both steps 704 and 706 may be carried out in a manner described above in connection with FIG. 3. At step 708, a SDET may be carried out using a slider tester having a suspension assembly, which allows for attachment/insertion, testing, and subsequent removal of the slider. If the slider fails tests carried out by the slider tester, the failed slider may be set aside or discarded at step 710. If the slider passes tests carried out in the slider tester and Reader 1 is selected, Reader 1 is attached to a TGA at step 712. If the slider passes tests carried out in the slider tester and Reader 2 is selected, Reader 2 is attached to a TGA at step 714. At step 716, the selected read sensor (Reader 1 or Reader 2) with its attached TGA is connected in a head stack assembly (HSA). Thereafter, at step 718, remaining portions of the drive are assembled, and the assembled drive is tested. It should be noted that, when sliders are tested in accordance with the embodiment of FIG. 7, trace connections to two read sensors may not be needed in the drive. This is because only the selected read sensor may be operational during the lifetime of the drive.

The method described above in connection with FIG. 7 may involve sorting the tested slider population into three different test result groups such as "Reader 1," Reader 2" and "Fail." The Reader 1 and Reader 2 groups would each be mated to a TGA interconnect assembly. This is shown in FIGS. 8A and 8B that illustrate slider and TGA interconnect schematics for a Reader 1 selected slider/TGA and a Reader 2 selected slider/TGA, respectively. As can be seen in FIGS. 8A and 8B, the tail pad layouts of both TGAs are identical. In the interest of simplification, internal slider connections not shown in FIGS. 8A and 8B. In FIGS. 8A and 8B, the same reference numerals used in FIG. 6 are utilized for similar/corresponding elements. Also, in the interest of brevity, a description of those similar elements is not repeated. As can be seen in FIGS. 8A and 8B, pad Hr (806) can be connected to either Hr1 (602) or Hr2 (604). Similarly, R− (802) can be connected to R1− (620) or R2− (624) and R+ (804) can be connected to R1+ (618) or R2+ (622). Since the opposite (PCCA connect) end of the TGAs or the tail pad layouts are substantially identical, minimal to no additional hardware or test/optimization cost would be required to accommodate both groups of heads (i.e., heads with Reader 1 selected or heads with Reader 2 selected) in the drive. In such an embodiment, only one preferred read sensor (only Reader 1 or only Reader 2) would be used in the drive over the lifetime of the drive.

FIG. 9 is a simplified flow diagram 900 of a general method embodiment. At step 902, a plurality of read sensors (e.g. two or more read sensors) is formed. It should be noted that different sensors of the plurality of read sensors may formed with same target geometries and/or target characteristics (e.g. FIGS. 4A and 4B) or different target geometries (e.g. FIGS. 4C and 4D). At step 904, read measurements are performed on one or more storage media using each different one of the plurality of read sensors. At step 906, one of the plurality of read sensors is selected to be operational in a data storage device based on a comparison of the read measurements of the different ones of the plurality of read sensors to a predetermined quantity. In different embodiments, the selection of one of the plurality of read sensors to be operational in the data storage device is carried out in the data storage device during manufacture of the data storage device and prior to shipping of the data storage device, thereby enabling an improvement in data storage device yield.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
   one or more data storage media;
   at least one read transducer having a plurality of read sensors of differing geometries, wherein the differing geometries are different widths or different stripe heights for each of the different ones of the plurality of read sensors, with only one of the plurality of read sensors being operational to read data stored on the one or more data storage media and the other ones of the plurality of read sensors being non-operational in the data storage device; and
   an interconnect assembly comprising a generic trace coupled to the one of the plurality of read sensors that is operational to read the data stored on the one or more data storage media, wherein the other ones of the plurality of read sensors that are non-operational in the data storage device have no trace connections.

2. The data storage device of claim 1 and wherein different ones of the plurality of read sensors are substantially coplanar or the different ones of the read sensors are stacked one above the other.

3. The data storage device of claim 1 and further comprising a bearing surface, and wherein a first read sensor of the plurality of read sensors has a first bearing surface portion that defines a first rectangular perimeter along the bearing surface, and wherein a second read sensor of the plurality of read sensors has a second bearing surface portion the that defines a second rectangular perimeter along the bearing surface.

4. The data storage device of claim 3 and wherein the first rectangular perimeter has a first length that is greater than a second length of the second rectangular perimeter.

* * * * *